United States Patent Office 3,415,805
Patented Dec. 10, 1968

3,415,805
O-ALKYL-TYROSINE²-LYSINE⁸-VASOPRESSINS
Walter Siedel, Bad Soden, Taunus, and Karl Sturm and Rudolf Geiger, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 113,613, May 31, 1961. This application Aug. 17, 1965, Ser. No. 480,512
Claims priority, application Germany, June 2, 1960, F 31,364
2 Claims. (Cl. 260—112.5)

ABSTRACT OF THE DISCLOSURE

O-alkyl-tyrosine²-lysine⁸-vasopressins in which the alkyl group has from 1 to 4 carbon atoms, e.g. O-methyl-tyrosine²-lysine⁸-vasopressin.

This application is a continuation-in-part of co-pending application Ser. No. 113,613 filed May 31, 1961, now abandoned.

The present invention relates to new octapeptides of the Formula I

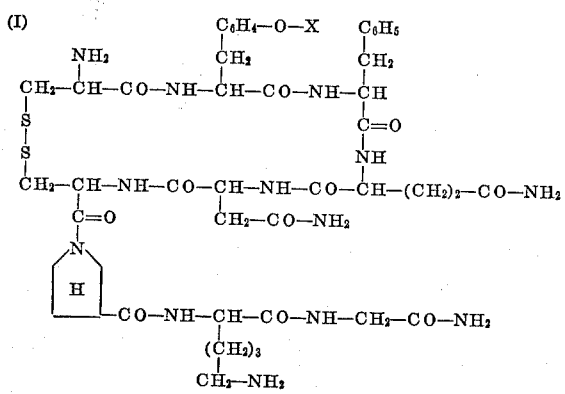

in which X represents an alkyl radical having from 1 to 4 carbon atoms,

The new octapeptides are valuable medicaments showing, in particular, a specific antidiuretic activity.

The compounds are obtained according to methods which are generally known for the synthesis of polypeptides, for instance, by reacting a N-R-S-R'-L-cysteinyl-O-alkyl-L-tyrosyl-L-phenylalanine-azide of the Formula III, (III) 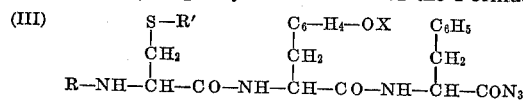

in which R represents a group introduced for the stabilization of the amino group and R' is a radical introduced in order to protect the sulfhydryl group, with a hexapeptide of the Formula II (II) 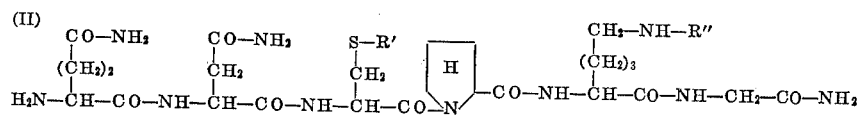

in which R" represents a benzenesulfonyl or a toluenesulfonyl radical introduced for the protection of the ε-amino group. The compounds may also be prepared by reacting a N - R - S - R' - L - cysteinyl - O - alkyl - L - tyrosyl - L-phenylalanine, in which R and R' have the meanings given above, with a hexapeptide of the Formula II in the presence of a condensing agent in order to obtain nonapeptides of the formula N-R-S-R'-L-cysteinyl-O-alkyl-L-tyrosyl - L - phenylalanyl - L - glutaminyl - L - asparaginyl - S - R' - L - cysteinyl - L - prolyl - Nε - R" - L-lysyl-glycinamide. The compounds may further be prepared by acylating a heptapepide of the Formula VI

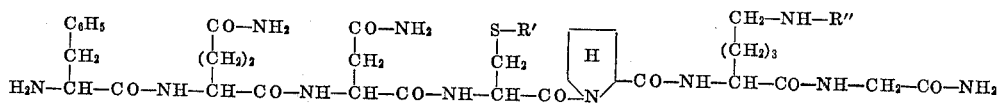

in which R' and R" have the meanings given above, with a functional, reactive derivative of a N-R'''-O-alkyl-L-tyrosine, in which R''' represents a carbobenzoxy radical which may be substituted, reacting the N-R'''-O-alkyl-L-tyrosyl - L - phenylalanyl - L - glutaminyl - L - asparaginyl - S - R' - L - cysteinyl - L - prolyl - Nε - R" - L-lysyl-glycinamide formed with a functional reactive derivative of a N-R-S-R'-L-cysteine by splitting off the radical R''' and then acylating the free amino group, in order to obtain nonapeptides of the formula N-R-S-R'-L-cysteinyl-O - alkyl - L - tyrosyl - L - phenylalanyl - L - glutaminyl-L - asparaginyl - S - R' - L - cysteinyl - L - prolyl - Nε-R"-L-lysyl-glycinamide. By splitting off the groups R, R', and R" in the compound by reduction with an alkali metal in liquid ammonia so that nonapeptides of the formula L - cysteinyl - O - alkyl - L - tyrosyl - L - phenylalanyl-L - glutaminyl - L - asparaginyl - L - cysteinyl - L - prolyl-L-lysyl-glycinamide are formed. By oxidizing the latter compounds with atmospheric oxygen at room temperature in aqueous solution at pH 6.5 to 8.5, the desired final product corresponding to the Formula I is obtained.

The new octapeptides corresponding to the Formula I exhibit a valuable antidiuretic activity comparable with that exhibited by lysine-vasopressin known from J. Am. Chem. Soc. 78 (1956), p. 2905 and 79 (1957) p. 5572. The activity of these compounds is much higher than that exhibited by phenylalanine²-lysine-vasopressin known from Helv. Chim. Acta 43 (1960) p. 190.

This surprisingly great antidiuretic activity of the new octapeptides of the Formula I is practically undiminished by secondary effects. Only an almost unnoticeable vasopressin action and a neglectable oxytocine action can be observed, so that the products of the invention are particularly distinguished by a specific antidiuretic activity which the peptides of the vasopressin type hitherto known do not possess. The differences are shown in the following Table:

TABLE

| Compound | Vasopressin action (I.U./mg.) | | Oxytocine action (I.U./mg.) | |
|---|---|---|---|---|
| | Blood pressure+ | Antidiurese++ | On isolated uterus of rat | On isolated virginal uterus of Guinea pig |
| o-Methyllysine-vasopressin | 2.4 | 275 | 0 | 0.2 |
| Lysine-vasopressin | 270 | 250 | 5 | 80 |
| Phenyl-alanine²-lysine-vasopressin | 55 | 20 | 0.3 | (¹) |

¹ Not examined.
+ Examined according to the method of Dekanski (Brit. J. Pharmacol. 7, page 567 (1952)).
++ Examined in compliance with the method of H. Burn et al. (Biological Standardization, 2nd ed., Oxford University Press (1950). In this method, the half-life period of water-separation is measured after subcutaneous injection in rats. The more the half-life period is prolonged, the stronger is the action of the compound. The reaction is carried out according to known methods.

According to a known advantageous method of carrying out the process, it is, for instance, possible to react a tripeptideazide of the Formula III in an appropriate solvent with a hexapeptide of the Formula II with formation of a nonapeptide of the Formula IV.

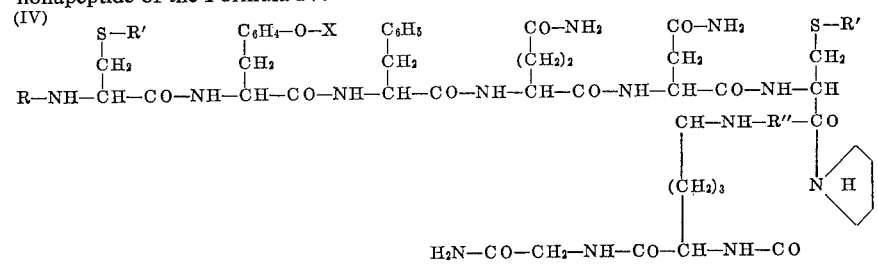

After splitting off the protective groups, the latter compound is converted by oxidation with atmospheric oxygen at room temperature in aqueous solution at pH 6.5 to 8.5 into the desired octapeptide of the Formula I.

In the Formulae II, III and VI the radical R represents a radical introduced in order to stabilize the α-amino group, for instance a benzenesulfonyl, toluenesulfonyl, carbophenoxy-, carbobenzoxy or p-bromocarbobenzoxy radical, and R' represents a radical introduced in order to protect the sulfhydryl groups, for instance a benzyl, para-bromobenzyl- or para-methylbenzyl radical. The radical R'' represents a benzenesulfonyl or a para-toluenesulfonyl radical introduced in order to protect the ε-amino group. The substituent X stands for an alkyl group having from 1 to 4 carbon atoms, preferably a methyl or ethyl group.

The reaction is performed in the usual manner and may be varied according to the individual substituents and the conditions prevailing in each case. The two components are favorably reacted in an appropriate organic solvent, for instance dimethylsulfoxide or dimethylformamide. The reaction solution is allowed to stand for some hours at 0° C. and subsequently for 1 to 2 days at 20° C.

For working up the mixture it is suitably concentrated under reduced pressure, the reaction product is precipitated by addition of ethyl acetate, and the precipitate that forms is filtered off with suction and dried under reduced pressure over calcium chloride.

The hexapeptide of the Formula II used as starting material (for instance N-carbobenzoxy-L-glutaminyl-L-asparaginyl - S - benzyl - L - cysteinyl - L - prolyl - ε - N-tosyl-L-lysyl-glycinamide) may be prepared, for instance, as described by R. A. Boissonnas in Helv. Chim. Acta 43 (1960) p. 190, from L-prolyl-ε-N-tosyl-L-lysyl-glycinamide and N-carbobenzoxy-L-glutaminyl-L-asparaginyl-S-benzyl-L-cysteinazide by heating in dimethylformamide. The tripeptide-azide of the Formula III reacting with the hexapeptide can be prepared according to the following method:

An N-R-S-R'-L-cysteinyl-O-alkyl-L-tyrosine in which R and R' have the meanings given above, is treated with an L-phenyl-alanine-alkyl ester in an appropriate solvent, for instance ethyl acetate, in the presence of dicyclohexylcarbodiimide as a condensing agent. The resulting tripeptide ester is converted in known manner by means of hydrazine hydrate into the corresponding hydrazide and the latter is reacted with sodium nitrite in acetic acid/hydrochloric acid in order to obtain the corresponding tripeptide-azide (III).

Instead of the tripeptide-azide of the Formula III there can likewise be used a tripeptide with free carboxy group (IIIb) for the reaction with the above-mentioned hexapeptide of the Formula II. When operating in this manner, an N-R-S-R'-L-cysteinyl-O-alkyl - L - tyrosyl - 1 - phenyl-alanine-alkyl ester (tripeptide ester IIIa) may be carefully hydrolyzed to the corresponding free acid (tripeptide IIIb) and the latter may be reacted in the presence of a suitable condensing agent such as dicyclohexylcarbodiimide or tetraethyl-pyrophosphite with the hexapeptide of the Formula II in order to obtain the desired nonapeptide of the Formula IV. According to another method, it is possible to start from a heptapeptide of the Formula VI

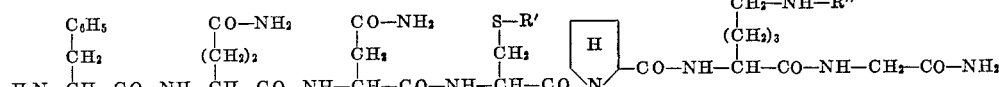
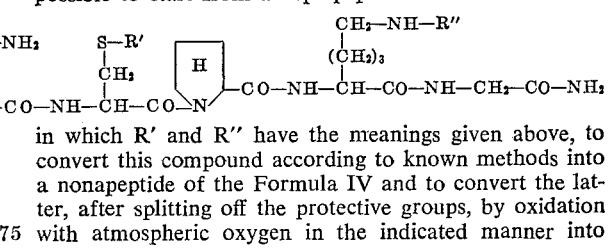

in which R' and R'' have the meanings given above, to convert this compound according to known methods into a nonapeptide of the Formula IV and to convert the latter, after splitting off the protective groups, by oxidation with atmospheric oxygen in the indicated manner into the desired octapeptide of the Formula I. The following operating method has proved suitable: An N-carbobenzoxy-O-alkyl-L-tyrosine-nitrophenyl ester or some other reactive functional derivative of N-carbobenzoxy-O-alkyl-L-tyrosine, in an appropriate solvent such as dimethylformamide, is reacted with a heptapeptide of the Formula VI. After standing for several hours at room temperature the reaction product is precipitated with ethyl acetate. The precipitate is washed with a suitable organic solvent and dried. The carbobenzoxy group is split off in the usual manner, from the reaction product obtained, for instance by means of hydrogen bromide in glacial acetic acid. The reaction product precipitated with ether is then immediately taken up in dimethylformamide and reacted with an N-R-S-R'-cystein-nitrophenylester in the presence of a tertiary organic base, for instance triethylamine, in order to obtain the desired nonapeptide of the Formula IV. The radicals introduced into the nonapeptide IV for the protection of the functional groups are split off by treatment with alkali metal, preferably sodium or potassium in liquid ammonia. In the subsequent oxidation with atmospheric oxygen in aqueous solution at a pH-value of 6.5 to 8.5, the disulfide linkage of the cyclic octapeptide I is formed from the two mercapto groups.

Due to their antidiuretic efficiency the new products are valuable medicaments that may be used, for instance, for treatment of "diabetes insipidus."

They can be used as such or in admixture with pharmaceutically suitable carrier substances and auxiliaries for parenteral or sublingual application. They can furthermore be applied via the oral mucosa or the nasal mucous membrane, in which case the products may be administered for instance in the form of a nasal spray or as snuffing powder (trituration of the lyophilized octapeptide with lactose prior to application). The preferred form of administration is intravenous injection. For this purpose the new octapeptides can be used in the form of preferably isotonic aqueous solutions free of pyrogen which, for stabilization, may be provided with an addition of trichloro-tert. butanol. The dosage is from 1 to 5 international units, 1 international unit corresponding to about 10–50γ of the products. For preparing an injection solution which may be used for intravenous administration, 5 grams of trichloro-tert. butanol together with 6 grams of sodium chloride are dissolved in 1000 cc. of double distilled water, saturated with nitrogen and free of pyrogen. The desired amount of the lyophilized octapeptide is introduced into this solution. The solution is filled into ampoules.

The following examples serve to illustrate the invention but they are not intended to limit it thereto:

Example 1.—N-carbobenzoxy - S - benzyl-L-cysteinyl-O-methyl - L - tyrosyl - L - phenylalanyl-L-glutaminyl-L-asparaginyl-S-benzyl-L-cysteinyl-L - prolyl - $N_\epsilon$ - tosyl-L-lysyl-glycinamide (nonapeptide IV)

7.5 grams of N-carbobenzoxy-S-benzyl-L-cysteinyl-O-methyl-L-tyrosyl-L-phenylalanineazide (tripeptide - azide III) (about 0.01 mol) and 8.1 grams (0.009 mol) of L-glutaminyl-L - asparaginyl-S-benzyl-L-cysteinyl-L-prolyl-$N_\epsilon$-tosyl-L-lysyl-glycinamide (hexapeptide II) are dissolved at room temperature in 120 cc. of pure dimethylformamide. A small amount of undissolved matter is filtered off with suction and the reaction mixture is maintained overnight at 0° and then for 2 days at 20° C. It is then concentrated under reduced pressure to 60 cc. and shaken with 500 cc. of ethyl acetate. The colorless precipitate is filtered off with suction and washed twice with 200 cc. of ethyl acetate. The moist nonapeptide IV is then triturated with 200 cc. of methanol at room temperature, filtered off with suction and washed at first with 100 cc. of methanol, then with ethyl acetate and subsequently with ether.

After drying under reduced pressure over calcium chloride there are obtained 7.6 grams (55% of the theory) of the product in the form of a colorless powder. The compound melts at 209–211° C.; $[\alpha]_D^{20} = 39.1°$ C. (c.=2 in dimethylformamide).

O-methyl-tyrosine[2]-lysine[8]-vasopressin (octapeptide I). —3.08 grams of the nonapeptide IV obtained are dissolved in 2000 cc. of liquid ammonia distilled over potassium hydroxide. Fine, pure sodium chips are introduced into the solution with mechanical stirring until the solution shows a deep blue color and the coloration is stable for 1 minute. After addition of 1.0 gram of ammonium chloride the ammonia is distilled off at room temperature, the syrupy residue is taken up with 2000 cc. of acetic acid of 0.2% strength and the solution is adjusted to a pH-value of 8.0 by means of acetic acid of 5% strength. After introducing air free from carbon dioxide into the solution for 3 hours, it is filtered, the colorless filtrate is adjusted to pH 4.5 by means of glacial acetic acid and lyophilized. The crude product is purified by distribution in counter current between secondary butanol and 0.08 molar p-toluenesulfonic acid. The biologically active fraction with the distribution coefficient $K = 0.82$ contains 45% of the total nitrogen. The $R_F$-value is 0.33 (methylethyl ketone/pyridine/water 65/15/20).

The tripeptide-azide of the Formula II used as starting substance can be prepared, for instance, as follows:

(a) N-carbobenzoxy - S - benzyl-L-cysteinyl-O-methyl-L-tyrosyl-L-phenylalanine-methyl ester.—17.2 grams of N-carbobenzoxy-S-benzyl-L-cysteinyl - O - methyl-L-tyrosine are dissolved in 80 cc. of ethyl acetate and a mixture of 8.0 grams of L-phenylalanine-methyl ester-hydrochloride, 5.4 cc. of triethylamine and 80 cc. of chloroform is added. At 0° C. there is then added a solution of 7.1 grams of dicyclohexylcarbodiimide in 20 cc. of chloroform and the reaction mixture is allowed to stand for 1 day at room temperature. The precipitate is filtered off with suction and boiled out with 200 cc. of ethyl acetate. A jelly-like crystalline mass consisting of the desired tripeptide ester already separates from the combined filtrates when they are concentrated to one-fourth their initial volume. After cooling, the solvent is filtered off with suction and the precipitate is recrystallized from ethanol. The yield amounts to 18.0 grams, the melting point is 167–168° C.

(b) N - Carbobenzoxy-S-benzyl-L-cysteinyl-O-methyl-L-tyrosyl - L - phenylalanine-hydrazide (tripeptide-hydrazide.—The N-carbobenzoxy-S-benzyl-L-cysteinyl-O-methyl-L-tyrosyl-L-phenylalanine-methyl ester (tripeptide IIIa) prepared as described in Example 1a is dissolved in 300 cc. of warm ethanol and 25 cc. of hydrazine hydrate of 80% strength are added. On slow cooling to room temperature and standing overnight 10.0 grams of N-carbobenzoxy-S-benzyl - L - cysteinyl - O - methyl-L-tyrosyl-L-phenylalanine-hydrazide separate. The melting point is 219–220° C.

(c) N-Carbobenzoxy-S-benzyl-L-cysteinyl-O-methyl-L-tyrosyl-L-phenylalanine-azide (tripeptide-azide III).—6.84 grams of the tripeptide-hydrazide prepared as described in Example 1 are dissolved with heating in a mixture of 220 cc. of glacial acetic acid and 35 cc. of hydrochloric acid. Within 5 minutes 11.5 cc. of sodium nitrite solution are dropped into the solution cooled to 5° C., while mechanically stirring. When the addition is terminated, the mixture is maintained for a further 5 minutes at 3° C. and stirred into 500 cc. of ice water. The separated tripeptide-III-azide is filtered off with suction, washed with ice water until neutral and dried over calcium chloride under a pressure of 0.2 mm.

Example 2

8.3 grams of N-carbobenzoxy-S-benzyl-L-cysteinyl-O-methyl-L-tyrosyl-L-phenylalanine - methyl ester are dissolved in 100 cc. of dioxane. 20 cc. of methanol and 15 cc. of sodium hydroxide solution are added at room temperature. The solution which is at first inhomogeneous becomes homogeneous by vibration mixing. After 2 hours 15.2 cc. of sulfuric acid are added to the solution, the solvent is removed under reduced pressure, the residue is taken up in ethyl acetate, the ethyl acetate solution is shaken out with a small amount of water, dried over sodium sulfate and the filtrate is evaporated under reduced pressure. There are obtained 7.7 grams of a resinous residue consisting of the free acid corresponding to the N-carbobenzoxy-S-benzyl - L - cysteinyl-O-methyl-L-tyrosyl-L-phenylalanine-methyl ester. The resinous residue is taken up in 60 cc. of dimethylformamide, 8.9 grams of L-glutaminyl-L-asparaginyl - S - benzyl-L-cysteinyl-L-prolyl-Nε-tosyl-L-lysyl-glycinamide (hexapeptide II) and 2.1 grams of dicyclohexylcarbodiimide are added and the reaction mixture is allowed to stand for 2 days at room temperature. It is then heated to about 40° C., the precipitate is filtered off with suction and the residue is washed with warm dimethylformamide. The product still contains traces of dicyclohexylurea. The yield in nonapeptide IV amounts to 7.5 grams $[\alpha]_D^{20} = -38°$ C. (c.=2 in dimethylformamide).

The further treatment of the nonapeptide IV is carried out as described in Example 1.

Example 3

1.0 gram of L-phenylalanyl-L-glutaminyl-L-asparaginyl-S-benzyl-cysteinyl - L - propyl - Nε-tosyl-L-lysyl-glycinamide (heptapeptide VI) and 0.5 gram of N-carbobenzoxy-O-methyl-L-tyrosine-nitrophenylester are dissolved in 10 cc. of dimethylformamide. After standing for 24 hours at room temperature 150 cc. of ethyl acetate are added to the semi-solid mass, the mixture is filtered off with suction, the precipitate is washed with 100 cc. of ethanol and then with 50 cc. of ethyl acetate. After drying the product weighs 1.05 grams and is sufficiently pure for further reaction.

The compound is suspended in 7 cc. of glacial acetic acid and 8 cc. of 4 N-hydrogen bromide solution in glacial acetic acid are added. After 2 hours 150 cc. of dry ether are added to the reaction mixture, the separated hydrobromide is washed several times with ether and is then dissolved in 10 cc. of dimethylformamide. 1.2 cc. of triethylamine and 0.45 gram of N-carbobenzoxy-S-benzyl-L-cysteine-nitrophenylester are then added. After 2 days 150 cc. of ethyl acetate are added to the solid mass, the precipitate is filtered off with suction, washed with 100 cc. of ethanol, 50 cc. of ethyl acetate and dried under reduced pressure. The yield in nonapeptide IV amounts to 0.9 gram, the melting point to 210–213° C. $[\alpha]_D^{20} = -39.5°$ C. (c.=2 in dimethylformamide).

Example 4.—O-ethyl-tyrosine²-lysine⁸-vasopressin

When operating as described in Example 1, 7.5 grams of N-carbobenzoxy - S - benzyl - L - cysteinyl-O-ethyl-L-tyrosyl-L-phenylalanine-azide (about 0.01 mol) and 8.1 grams (0.009 mol) of the hexapeptide II produce 7.5 grams (55% of theory) of N-carbobenzoxy-S-benzyl-L-cysteinyl-O-ethyl-L-tyrosyl-L-phenylalanyl - L - glutaminyl-L-asparaginyl-S-benzyl-L - cysteinyl-L-prolyl-Nε-tosyl-L-lysyl-glycinamide of a melting point of 216–218° C., $[\alpha]_D^{20} = 39.1°$ C., which upon treatment with sodium in liquid ammonia and oxidation with atmospheric oxygen is transformed into the deisred octapeptide. The yields are the same as that obtained with the preparation of O-methyl-tyrosine²-lysine⁸-vasopressin. The crude product formed is purified as described in Example 1 by distribution in counter current between secondary butanol and 0.08-molar p-toluenesulfonic acid. Distribution coefficient K=0.84, $R_F$-value=0.35 (methyl ethyl ketone/pyridine/water 65/15/20).

We claim:

1. O-alkyl - tyrosine² - lysine⁸-vasopressin wherein the alkyl group has from 1 to 4 carbon atoms.

2. O-methyl-tyrosine²-lysine⁸-vasopressin.

References Cited

UNITED STATES PATENTS 3,232,923  2/1966  Boissonnas et al. ___ 260—112.5

FOREIGN PATENTS 927,714  6/1963  Great Britain.
691,286  7/1964  Canada.

OTHER REFERENCES

Boissonnas et al.: Helv. Chim. Acta., 190–194, 200 (1960).

Law et al.: J. Am. Chem. Soc., 82, 4579–4581 (1960). (Copies in P.O.S.L.)

LEWIS GOTTS, *Primary Examiner.*

M. M. KASSENOFF, *Assistant Examiner.*

U.S. Cl. X.R.

167—65, 74